US006804762B1

United States Patent
Dussud et al.

(10) Patent No.: US 6,804,762 B1
(45) Date of Patent: Oct. 12, 2004

(54) METHOD AND SYSTEM FOR GARBAGE COLLECTION USING A DYNAMICALLY TUNED WRITE BARRIER

(75) Inventors: Patrick H. Dussud, Bellevue, WA (US); Brian D. Harry, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 09/628,610

(22) Filed: Jul. 31, 2000

(51) Int. Cl.[7] .............................................. G06F 12/00

(52) U.S. Cl. ...................................... 711/170; 707/206

(58) Field of Search ........................... 711/170; 707/206

(56) References Cited

U.S. PATENT DOCUMENTS

| 5,842,016 A | 11/1998 | Toutonghi et al. | .......... 709/106 |
| 6,055,612 A | 4/2000 | Spertus et al. | .............. 711/165 |
| 6,065,020 A | 5/2000 | Dussud | ...................... 707/206 |

OTHER PUBLICATIONS

Courtemanche, A., "MultiTrash, a Parallel Garbage Collector for MultiScheme",*Massachusetts Institute of Technology*, pp. 1–47 (1986).
Jones, R. et al., "Garbage Collection: Algorithms for Automatic Dynamic Memory Mangement", *John Wiley & Sons*, pp. 184–226 (1996).

*Primary Examiner*—Reginald G. Bragdon
(74) *Attorney, Agent, or Firm*—Merchant & Gould P.C.

(57) ABSTRACT

A method of detecting and indicating pointers in an ephemeral region of memory in a computing system includes monitoring stored memory for pointers; detecting if there are pointers above the ephemeral range; and if there are not pointers above the ephemeral range, then testing if a pointer is above a lower limit of the ephemeral range without testing if the pointer is also below an upper limit of the ephemeral range. A system for detecting and indicating pointers in an ephemeral region of memory in a computing system includes a monitor module, a pointer module, and a lower limit module. The monitor module monitors stored memory for pointers. The pointer module detects if there are pointers above the ephemeral range. The lower limit module tests if a pointer is above a lower limit of the ephemeral range without testing if the pointer is also below an upper limit of the ephemeral range, if there are not pointers above the ephemeral range.

30 Claims, 6 Drawing Sheets

METHOD AND SYSTEM FOR GARBAGE COLLECTION USING A DYNAMICALLY TUNED WRITE BARRIER

TECHNICAL FIELD

The present invention relates to garbage collection and more particularly to reclamation of allocated memory in a computing system using a dynamically tuned write barrier.

BACKGROUND

During execution of a computer program or computer application, memory is allocated to the program by the operating system to enable various operations. Once allocated, other executing processes cannot use the memory allocated to that program, i.e., memory use is exclusive. When the program has finished using a portion or object of allocated memory, it can explicitly de-allocate or release that memory. For example, the program might dispose, kill, or free the memory via a specific programming code function. Once freed, other applications or processes can use the memory. This methodology has disadvantages. One such disadvantage is that the program that releases the memory does not know whether another program has claimed that memory since it was originally allocated. Thus, the program could release memory that another program is utilizing.

In some instances, the program to which the memory was initially allocated does not release the memory, even after the program is finished using that memory. Moreover, when a program is done using a memory block or object, references to that object no longer exist. Without such a reference, that memory object cannot be reached by the application. Consequently, once the program has finished using the memory, that memory cannot be reused until it is freed by the program or reclaimed by another memory management program and then reallocated to either the initial application or process or to another application or process. Thus, allocated, yet unreachable, objects are unusable and are considered to be dead or garbage.

Typically, the processes of allocating memory objects to applications and reclaiming dead memory objects, i.e., garbage collection, are performed by a memory manager. The memory manager tracks which memory objects are currently allocated to the computer program and which objects are currently available to be allocated through a free list that keeps track of available objects. Thus, memory objects that are not on the free list are currently allocated to a computer program or application. Other memory managers do not use a free list and instead allocate memory using an increasing memory address scheme. In such a case, it becomes important to not only reclaim dead memory objects, but also compact the live objects to prevent using up all of the memory.

There are several common techniques for garbage collection. One technique is referred to as copying and relates to logically dividing the memory in half and using only one half of the memory at a time. During garbage collection, the memory manager copies all reachable objects to the other half of the memory. Following the copying of all reachable objects, the memory manager adds the entire first half of memory to the free list. Consequently, the previously used memory, that contained both the reachable objects and the garbage objects, becomes free memory and therefore contains only objects that are available to be allocated. In other words, the garbage memory has been reclaimed for later use.

Another common garbage collection technique relates to the mark-and-sweep method. The mark-and-sweep technique marks all reachable objects of memory. Each memory object reachable by a program application is marked as reached by the garbage collector. The garbage collector then sweeps the entire heap to reclaim all unmarked objects of memory by adding the unmarked objects to the free list. When the sweep phase is complete, all garbage objects are now on the free list and available to be reallocated to a computer program.

Generational garbage collection refers to operating the garbage collection on only a portion of the memory at a time. Generational garbage collection reduces pause times to the user by collecting only a portion of the memory rather than the entire memory. However, collecting only a portion of the memory has disadvantages. One such disadvantage is that pointers from old memory objects, those that are in the portion not being operated on, to new memory objects, those in the portion being operated on, are difficult to detect. In addition, the portion of the memory being operated on is constantly changing, making it difficult to detect generational pointers. For example, the ephemeral range changes each time the garbage collector is run. Further optimization is desired.

SUMMARY

In accordance with the present invention, the above and other problems are solved by the following:

In one aspect of the present invention, a method of detecting and indicating pointers in an ephemeral region of memory in a computing system is provided. The method includes monitoring stored memory for pointers; detecting if there are pointers above the ephemeral range; and if there are not pointers above the ephemeral range, then testing if a pointer is above a lower limit of the ephemeral range without testing if the pointer is also below an upper limit of the ephemeral range.

In another aspect of the present invention, a computer program product readable by a computing system and encoding instructions for a computer process for detecting and indicating pointers in an ephemeral region of memory in a computing system is provided. The computer process comprises instructions analogous to that described above.

In another aspect of the present invention, a system for detecting and indicating pointers in an ephemeral region of memory in a computing system is provided. The system includes a monitor module, a pointer module, and a lower limit module. The monitor module monitors stored memory for pointers. The pointer module detects if there are pointers above the ephemeral range. The lower limit module tests if a pointer is above a lower limit of the ephemeral range without testing if the pointer is also below an upper limit of the ephemeral range, if there are not pointers above the ephemeral range.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, that are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes methods, systems and an article of manufacture containing the methods for a dynamically tuned write barrier for garbage collection. Preferably, the garbage collection system traverses only the ephemeral range of the entire memory. Ephemeral range of memory refers to a portion of memory that contains the memory objects most recently allocated. Each memory block pointed to by the applications currently running in the ephemeral range is marked as "reached." Generational pointers are detected via a write barrier. The garbage collection system is optimized such that only the lower limit of the ephemeral range needs to checked to determine if pointers are in the ephemeral range.

Figure 1:
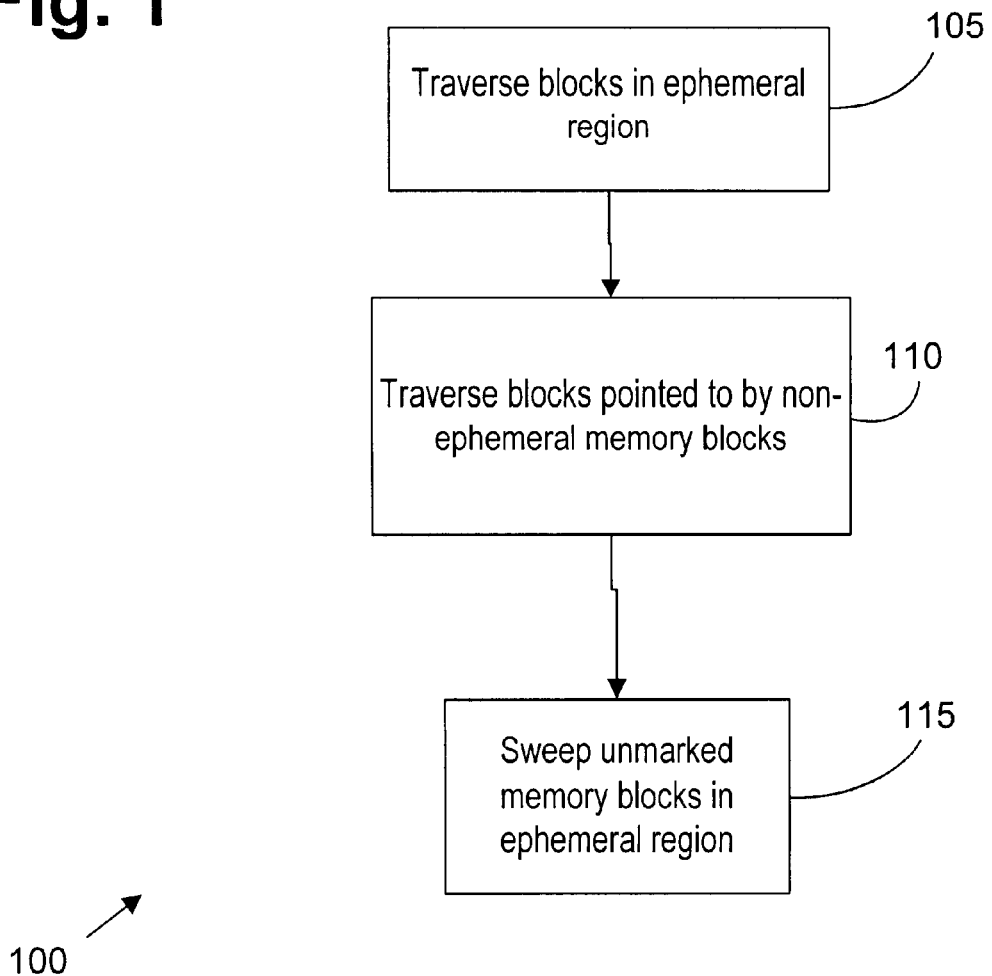
FIG. 1 is a schematic representation of methods and systems for garbage collection, according to an exemplary embodiment of the present invention.

Referring now to FIG. 1, a schematic representation of a garbage collection system 100 is illustrated. During garbage collection, a first traverse module 105 traverses all of the memory blocks in the ephemeral region that are referenced by any applications currently running. The ephemeral region is the portion of memory containing the most recently allocated memory blocks. The system 100 defines the ephemeral region by detecting memory blocks that exceed a lower memory address limit. The traverse module 105 also marks each memory block reached.

A second traverse module 110 traverses all of the memory blocks in the ephemeral region that are pointed to by non-ephemeral memory blocks. In other words, the traverse module 105 is looking for generational pointers from old memory blocks to memory blocks in the ephemeral region. A write-barrier is used to detect generational pointers to ephemeral memory blocks by non-ephemeral memory blocks. A sweep module 115 sweeps the unmarked memory blocks in the ephemeral region and reclaims the unmarked memory blocks for later use.

Figure 2:
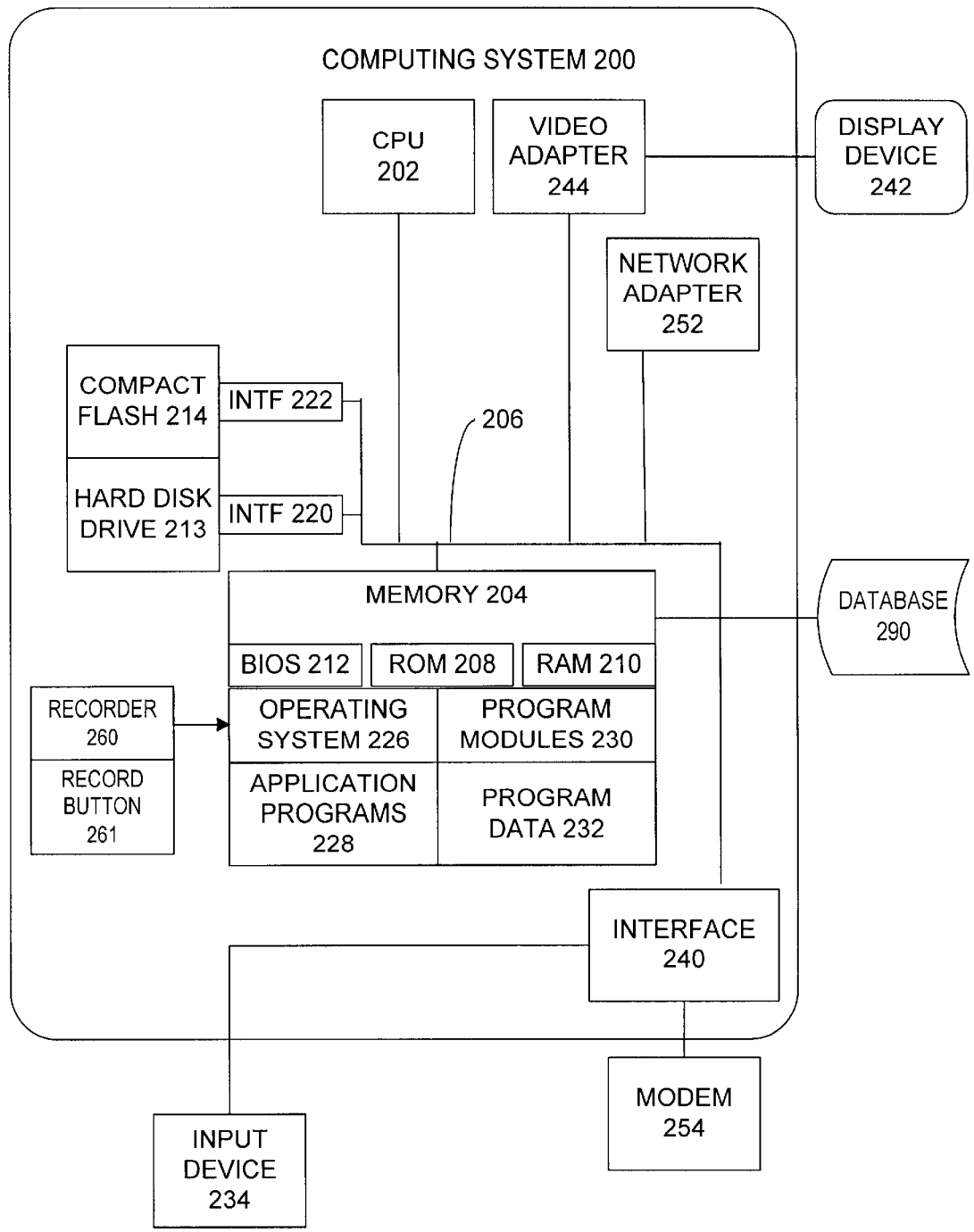
FIG. 2 is a schematic representation of a computing system that may be used to implement aspects of the present invention.

FIG. 2 and the following discussion are intended to provide a brief, general description of a suitable computing environment in which the invention might be implemented. Although not required, the invention is described in the general context of computer-executable instructions, such as program modules, being executed by a computing system. Generally, program modules include routines, programs, objects, components, data structures, etc. that perform particular tasks or implement particular abstract data types.

Those skilled in the art will appreciate that the invention might be practiced with other computer system configurations, including handheld devices, palm devices, multiprocessor systems, microprocessor-based or programmable consumer electronics, network personal computers, minicomputers, mainframe computers, and the like. The invention might also be practiced in distributed computing environments where tasks are performed by remote processing devices that are linked through a communications network. In a distributed computing environment, program modules might be located in both local and remote memory storage devices.

Referring now to FIG. 2, an exemplary environment for implementing embodiments of the present invention includes a general purpose computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
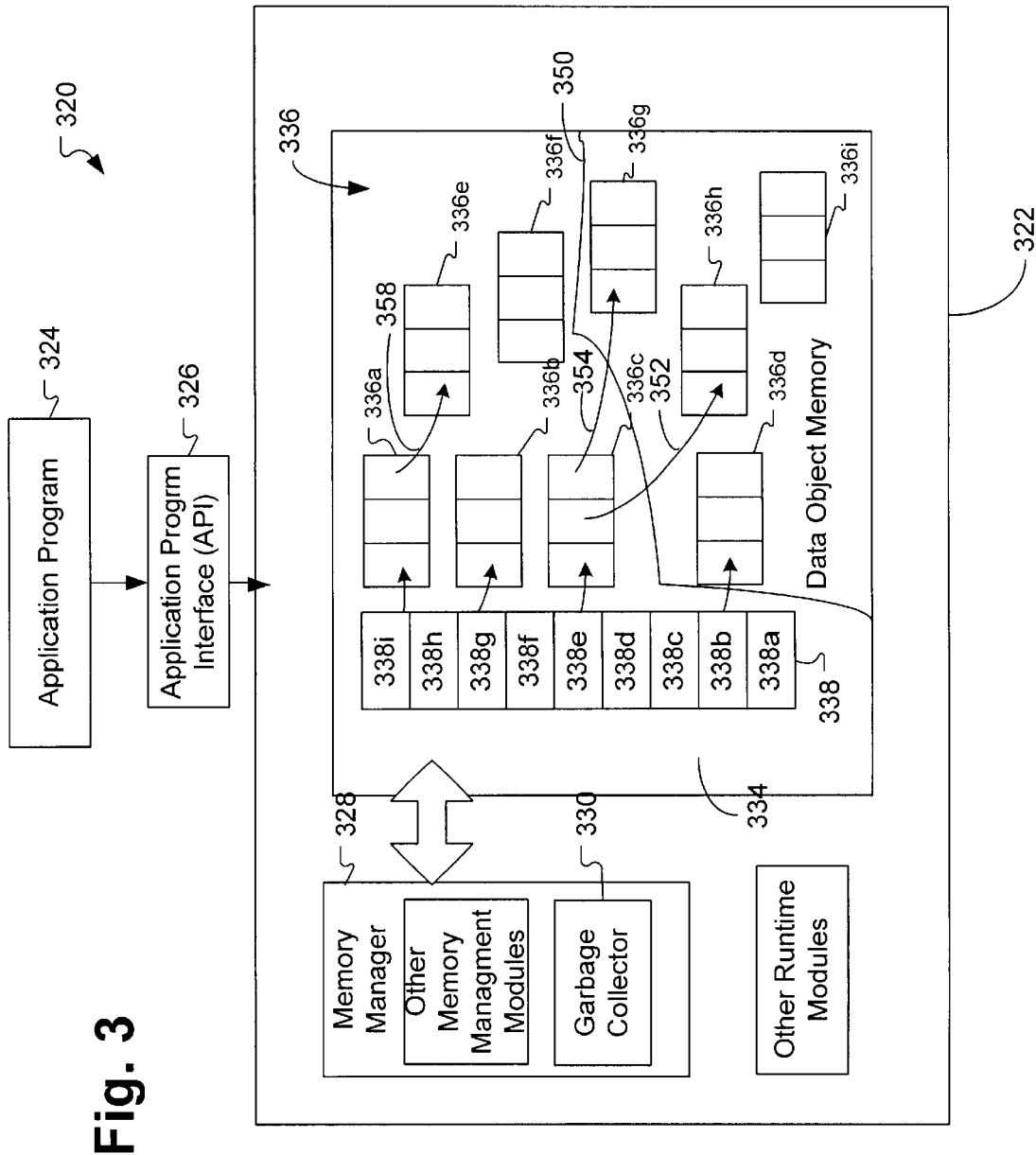
FIG. 3 is a schematic representation of a computer architecture that may be used to implement aspects of the present invention.

Referring now to FIG. 3, an exemplary software environment for implementing aspects of the present invention includes a garbage collection system 320. The garbage collection system 320 has a runtime environment 322 that operates to execute application programs and processes, such as an application program 324. The application program 324 might directly communicate with the runtime environment 322 or communicate through an application program interface, such as an application program interface 326 illustrated in FIG. 3.

Preferably, the runtime environment 322 incorporates a memory manager 328 having a garbage collector module 330. In alternative embodiments, the garbage collector might not be in the memory manager, and might even be a separate application program apart from the runtime environment. The runtime environment 322 also incorporates a memory portion 334, which is the portion of memory that maintains allocated memory objects such as memory objects, or blocks, 336 for the application program 324. The connection of the various memory objects 336 is often referred to as a "graph." In addition to the memory objects 336, the memory portion 334 also maintains a stack 338 of root references 338a, 338b, 338c, 338d, 338e, 338f, 338g, 338h, and 338i. The root references 338a, 338b, 338c, 338d, 338e, 338f, 338g, 338h, and 338i are storage locations that are always deemed to be live, i.e. not garbage. The stack 338 typically contains object reference information that references memory objects 336a, 336b, 336c, and 336d where object reference information is essentially a variable that contains the memory location, or address, of some data rather than the data itself.

The memory objects 336, in turn, might have object reference information that references other memory objects. For example, in FIG. 3, memory object 336a references object 336e, and memory object 336c references both memory objects 336g and 336h. In some instances, the memory objects 336 might not have information referencing other memory objects, such as memory object 336d, which does not reference any other memory object 336. Additionally, some memory objects 336, such as memory object 336f, might exist that were previously referenced by either a root reference or another memory object but are no longer referenced by either.

The memory objects, such as memory objects 336a, 336b, 336c, 336d, 336e, 336g, and 336h are all referenced by another memory object or root, and are therefore considered to live and referenced. On the other hand, memory objects 336f, 336i are not referenced by another memory object or root and therefore are considered to be garbage, i.e., space no longer required by the computing system but that has not yet been reclaimed by the garbage collector 330.

The memory manager 328 determines, based on predetermined thresholds, when to perform garbage collection. A common predetermined threshold is based on the amount of memory allocated. That is, the memory manager 328 maintains a running total of the amount of allocated memory and once the amount of memory exceeds a predetermined threshold number, the memory manager 328 initiates garbage collection. Following the garbage collection, the running total of allocated memory is reduced by the number of reclaimed objects in memory. Once the running total exceeds the predetermined threshold again, the memory manager 328 simply reinitiates the garbage collection process.

Using the mark-and-sweep technique, the garbage collector 330 traverses the memory objects referenced by a currently running application program, such as the application program 324. The garbage collector 330 begins with the stack 338 of root references. The live memory objects 336a, 336b, 336c, 336d, 336e, 336g, and 336h are marked as reachable. During the sweep phase, each memory block 336a, 336b, 336c, 336d, 336e, 336f, 336g, and 336h is traversed. The unmarked memory blocks 336f and 336i are reclaimed by the garbage collector for later use.

In some instances, the garbage collector 330 operates only on portions of the memory at a time. In such a case, the memory might be divided into segments, where a given portion of the most recently allocated memory objects makes up an "ephemeral" portion, range, or region. The garbage collector 330 might operate solely on the ephemeral portion, or it might operate on different portions at different times. The rationale for operating solely on the ephemeral portion is because the ephemeral portion contains the most recently allocated memory objects that are more likely to be unused than those that are older and have already survived a garbage collection clean-up. In other words, typically, the memory objects in the ephemeral region have short life spans, while the memory objects in the other regions tend to have longer life spans.

In instances where the garbage collector operates on only the ephemeral region, a full garbage collection on the entire memory space is also periodically operated. For example, as the ephemeral range fills up with allocated memory, the garbage collector will traverse the ephemeral range. Some memory will survive the garbage collection. The ephemeral range is then moved to not include that memory that survived the last garbage collection. As this process continues, the entire memory space begins to fill, as some memory survives each garbage collection performed on the new ephemeral range. As the entire memory space fills, the garbage collector will operate on the entire memory space, moving the ephemeral range again and reclaiming more space. Operating on only the ephemeral range saves processing time and limits the amount of time that program execution has to be halted, because the garbage collector only has to examine a portion of the memory rather than the whole memory.

In FIG. 3, the ephemeral range lies below line 350 in the data object memory 334. In other words, memory objects 336d, 336g, 336h, and 336i are in the ephemeral range while memory blocks 336c, 336b, 336a, 336e, and 336f are not. Memory blocks 336d, 336g, 336h, and 336i were recently allocated while memory objects 336c, 336b, 336a, 336e, and 336f were not and survived a previous garbage collection operation. The rationale for operating only on the ephemeral region is that memory objects 336c, 336b, 336a, 336e, and 336f already survived a garbage collection, and therefore, are more likely to survive again. It is the newest memory objects 336d, 336h, 336g, and 336i that are more likely to be dead and are in the ephemeral region, so the garbage collector operates on these memory objects.

Generational pointers, pointers between memory objects in the ephemeral range and memory objects in the non-ephemeral range, are difficult to detect. In FIG. 3, memory object 336c in the non-ephemeral range points with a generational pointer 352 to memory object 336h in the ephemeral range. In addition, memory object 336c points with generational pointer 354 to memory object 336g in the ephemeral range. The generational pointers 352, 354 must be detected during garbage collection. If the generational pointers 352, 354 are not detected, the memory blocks 336g, 336h will be reclaimed by the garbage collector.

Preferably, a write-barrier is used to detect the generational pointers 352, 354. Write-barriers prevent programs from writing to memory objects without notifying the system. One such write-barrier is referred to as card-marking, which is commonly known. Card-marking divides the memory into small regions called cards. A bit table is associated with each card. When a pointer is created, the bit table is modified. In order to prevent the system from having to scan every bit table, a segment modification cache is used. A byte of this cache is set to non-zero when an entry is made in a corresponding bit table. Thus, the system need only scan those bit tables that have corresponding non-zero caches for pointers, such as generational pointers 352, 354.

Memory pointers can be of four types, including ephemeral pointers that point between ephemeral memory objects and ephemeral memory objects; old pointers that point between old memory objects and old memory objects, such as pointer 358; generational pointers from old memory objects to ephemeral memory objects, such as pointers 352, 354; and generational pointers from ephemeral memory objects to old memory objects, not illustrated. Generational pointers that point from old memory objects to ephemeral memory objects, such as pointers 352, 354 are of the greatest concern, since the ephemeral region is the region being examined.

A filter is placed in the card-marking technique. Preferably, the filter filters out all the pointers with a destination in the old memory area, such as pointer 358. In other words, the filter will keep only pointers with a destination in the ephemeral range, such as pointers 352, 354. It is fairly easy to check if the destination is in the ephemeral range because the ephemeral range is usually in one contiguous segment of memory, where the old memory range is fragmented.

Figure 4:
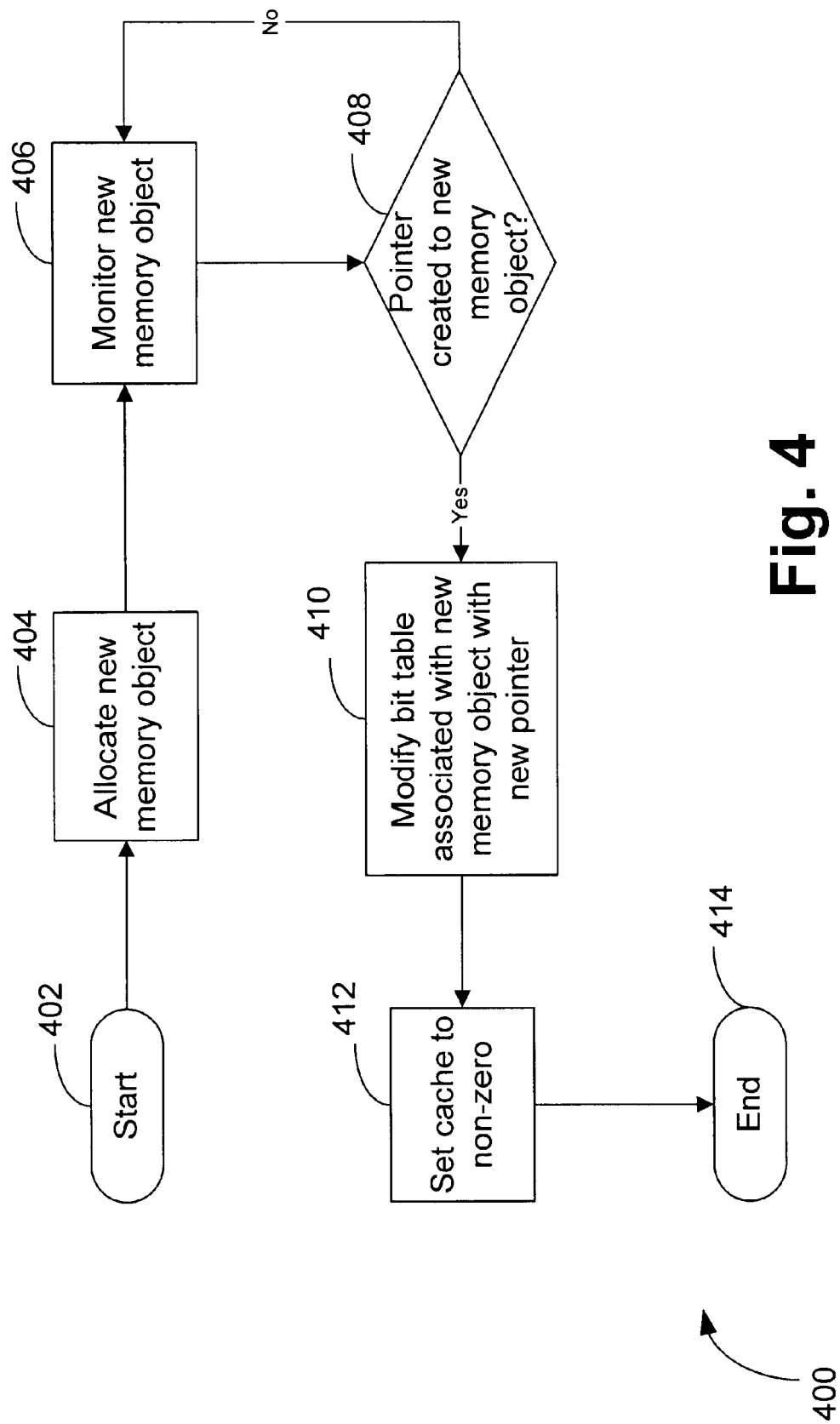
FIG. 4 is a flow chart illustrating the logical operations of a write-barrier system according to aspects of the present invention.

FIG. 4 is a flow chart representing logical operations of a write barrier system 400 for detecting pointers to newly stored memory objects in the ephemeral range. The write barrier system 400 continuously monitors newly stored memory objects for pointers in the ephemeral range. In other words, the write barrier system 400 runs simultaneously with other programs running on the computing system. The write-barrier system 400 provides an indication to the garbage collection system, explained in more detail below, that generational pointers exist.

Entrance to the operational flow of the write barrier system 400 begins at a flow connection 402. A store operation 404 stores a new memory object. A monitor operation 406 monitors the newly stored memory objects for pointers. A pointer module 407 detects whether there are any pointers above the ephemeral range. The pointer module 407 need only perform this test once, saving the result. Each successive pass through the operational flow, illustrated in FIG. 4, can bypass the pointer module 407 and go directly to the upper limit module 408 or the lower limit module 409, depending on the result of the pointer module 407. Of course, when a new segment of address space is added, the pointer module 407 again detects if there are any pointers above the ephemeral range.

If the pointer module 407 detects pointers above the ephemeral range, operational flow branches "YES" to an upper limit module 408. The upper limit module 408 detects if the pointer is below an upper limit. If the upper limit module 408 detects that the pointer is below an upper limit, operational flow branches "YES" to a lower limit module 409.

The lower limit module 409 detects if the pointer is above a lower limit. If the lower limit module 409 detects that the pointer is above a lower limit, operational flow branches "YES" to a modify operation 410. The modify operation 410 modifies a bit table associated with the newly stored memory object. A cache operation 412 sets a cache entry to non-zero, indicating to the garbage collection system, as will be described in more detail below, that a pointer exists in the ephemeral range. Operational flow ends at connection point 414.

Referring back to the pointer module 407, if the pointer module detects that there are not any pointers above the ephemeral range, operational flow branches "NO" to the lower limit module 409, and operational flow proceeds as previously described. Thus, when there are not any pointers above the ephemeral range, the system 400 needs to only perform one test, the lower limit test for each pointer.

If the upper limit module 408 detects that the pointer is above an upper limit, operational flow branches "NO" to the monitor operation 406. Likewise, if the lower limit module 409 detects that the pointer is below a lower limit, operational flow branches "NO" to the monitor operation 406.

Figure 5:
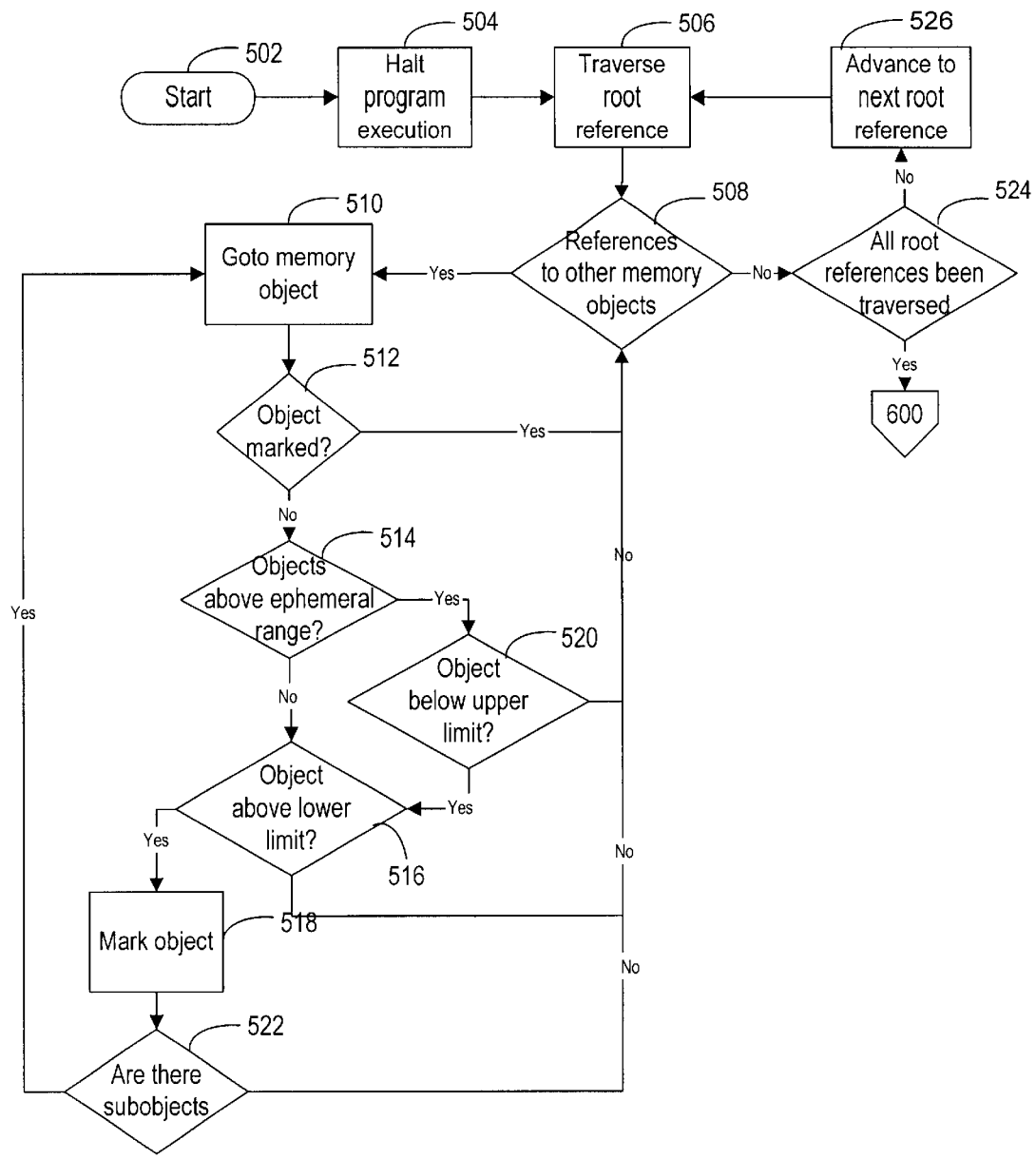
FIG. 5 is a flow chart illustrating the logical operations of the methods and systems of FIG. 1.

FIG. 5 is a flow chart representing logical operations of a garbage collection system 500 for reclaiming unused portions of ephemeral memory. Entrance to the operational flow of the garbage collection system 500 begins at a flow connection 502. A halt operation 504 stops execution on the computing system, such as the computing system 200 of FIG. 2, for all programs or applications, such as application program 324 of FIG. 3, that are currently running. The execution of these programs and applications are halted because the programs or applications might modify the memory in some unexpected manner. For example, a currently running program could add a reference if allowed to continue to run. The garbage collection system 500 would reclaim that memory block because the garbage collection system 500 would not be able to detect the new reference. Therefore, the execution of all the programs and applications is halted during garbage collection.

A traverse operation 506 traverses the root references in the stack, such as the stack 338 of FIG. 3. The traverse operation 506 begins with the first root reference, such as root reference 338a of FIG. 3. A reference module 508 detects if there are other references to other memory objects. For example, a root reference might refer to another memory object. The reference module 508 detects this reference. If the reference module 508 detects a reference to another memory object, operational flow branches "YES" to a goto operation 510. The goto operation 410 goes to the memory object referenced.

An object module 512 detects whether the memory object is already marked. Because the garbage collection system 500 is only operating on the ephemeral region, if the memory object is already marked then it is not in the ephemeral region. In other words, the memory object must have survived a previous garbage collection operation and is not a newly stored memory object. If the object module 512 detects that the memory object is marked, operational flow branches "YES" to the reference module 508. That is, if the memory object is marked, the memory object is ignored or skipped, and operational flow proceeds as previously described.

If the object module 512 detects that the memory object is not marked, operational flow branches "NO" to an upper limit module 514. The upper limit module 514 detects if the memory object is below an upper limit of the ephemeral range. If the upper limit module 514 detects that the memory object is above the upper limit of the ephemeral range, operational flow branches "NO" to the reference module 508. In other words, the memory object is ignored or skipped, because it is not in the ephemeral range.

If the upper limit module 514 detects that the memory object is below the upper limit of the ephemeral range, operational flow branches "YES" to a lower limit module 516. The lower limit module 516 detects if the object is above the lower limit of the ephemeral range. If the lower limit module 516 detects that the object is above the lower limit, operational flow branches "YES" to a mark operation 518. The mark operation 518 marks the memory object as "reached." In other words, the mark operation 518 flips a bit associated with the memory object indicating the memory object is live or in use. If the lower limit module 516 detects that the object is below the lower limit, operational flow branches "NO" to the reference module 508. In other words, the memory object is ignored or skipped, because it is not in the ephemeral range.

Referring back to the mark operation 518, after the mark operation 518 marks the memory object as "reached," operational flow proceeds to a subobject module 522. The subobject module 522 detects if the memory object marked by the mark operation 518 has any further subobjects. If the subobject module 522 detects that the memory object has further subobjects, operational flow branches "YES" to the goto operation 510, and operational flow proceeds as previously described for the subobject. If the subobject module 522 detects that the memory object does not have any subobjects, operational flow branches "NO" to the reference module 508.

Referring to the reference module 508, if the reference module 508 detects that there are not any other references to other memory objects, operational flow branches "NO" to a root module 524. The reference module 508 allows the garbage collection system 500 to traverse all of the memory blocks in a chain of references from a root reference. In other words, the reference module 508 allows the garbage collection system 500 to recursively examine memory blocks referenced from the root reference or from another memory block referenced by a root reference.

The root module 524 detects if all the root references have been traversed. If the root module 524 detects that not all of the root references have been traversed, operational flow branches "NO" to an advance operation 526. The advance operation 526 advances the system 500 to the next root reference, such as root reference 338b of FIG. 3. Thus, the root module 524 allows the garbage collection system 500 to traverse all of the root references in the stack. The root module 524 ensures that all of the root references are examined and the reference module 508 ensures that all of the memory objects referenced in a chain from the stack are examined. In this fashion, the garbage collection system 500 recursively examines and marks all live memory objects in the ephemeral region of the memory.

Referring to the root module 524, if the root module 524 detects that all of the root references have been examined, and therefore all of the live memory objects have been examined and marked, operational flow branches YES" to a flow connection 600. Operational flow resumes at flow connection 600 in FIG. 6.

The operational flow diagram depicted thus far, examines and marks all of the live memory objects in the ephemeral range, referenced by a root reference or by another memory object in the ephemeral range. However, any generational pointers from old memory objects to memory objects in the ephemeral range must also be identified so that those memory objects can be examined and marked. If the generational pointers are not identified, some of memory objects could be reclaimed by the garbage collection system 500 even though they are still live. The operational flow diagram as depicted in FIG. 6 ensures that such memory objects are found and marked.

Figure 6:
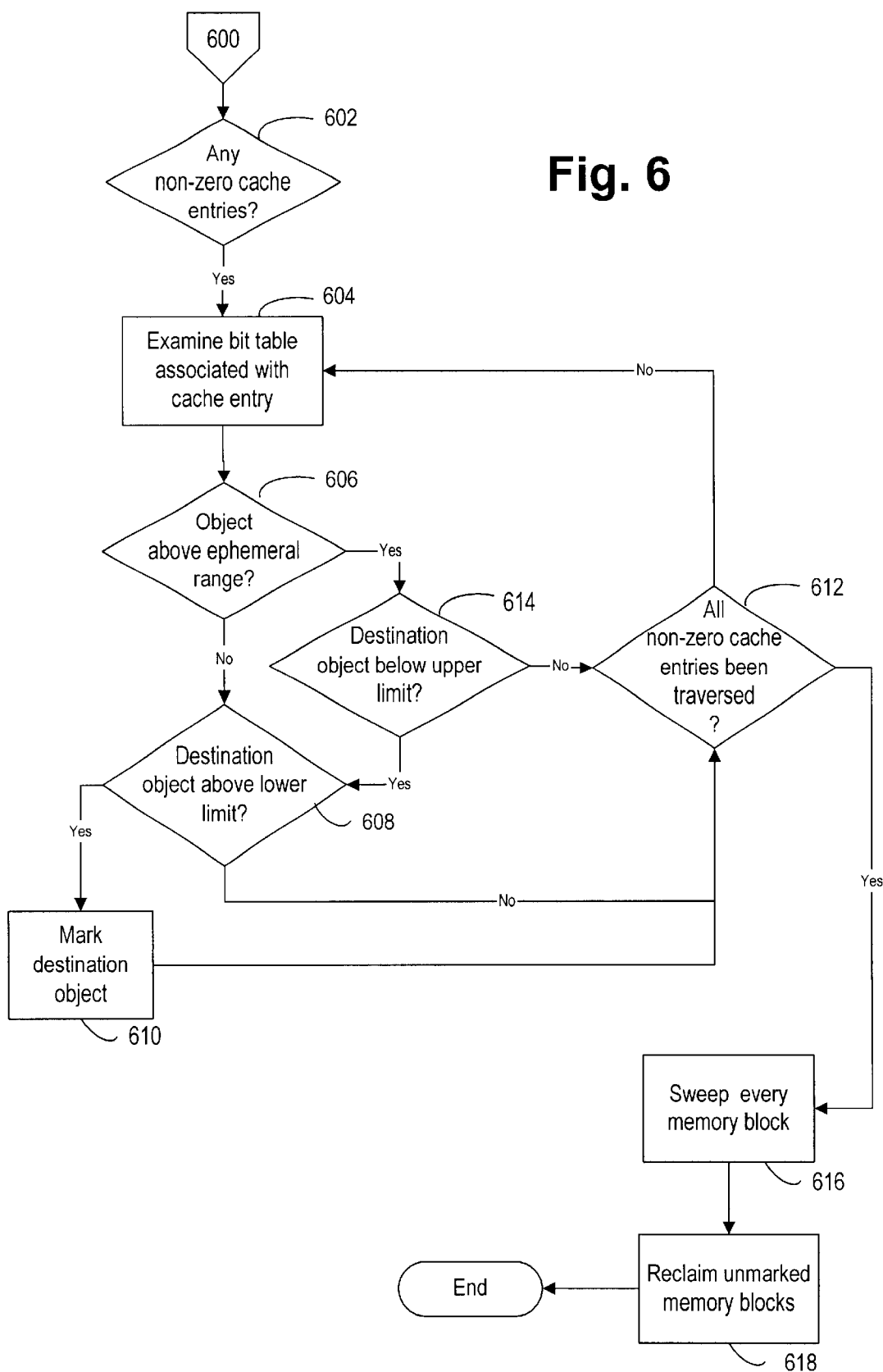
FIG. 6 is a flow chart continuing the logical operations of FIG. 5.

Referring now to FIG. 6, operational flow proceeds from flow connection 600 to a cache module 602. The cache module 602 detects if any cache entries are non-zero as described in connection with FIG. 4. If the cache module 602 detects that there are non-zero cache entries, operational flow proceeds to an examine operation 604. The examine operation 604 examines the bit table for the corresponding non-zero cache entries for pointers to memory objects. The bit tables were modified by the write-barrier system 400 of FIG. 4, in response to a pointer being added to a newly stored memory object.

An upper limit module 606 detects if the destination memory object of the pointer, referenced in the bit table examined by the examine operation 604, is below the upper limit of the ephemeral range. If the upper limit module 606 detects that the destination memory object is below the upper limit of the ephemeral range, operational flow branches "YES" to a lower limit module 608.

The lower limit module 608 detects if the destination memory object of the pointer, referenced in the bit table examined by the examine operation 604, is above the lower limit of the ephemeral range. If the lower limit module 608 detects that the destination memory object is above the lower limit of the ephemeral range, operational flow branches "YES" to a mark operation 610. The mark operation 610 marks this memory object as reached, or live. Operational flow proceeds to a cache module 612.

Referring back to the lower limit module 608, if the lower limit module 608 detects that the destination memory object is below the lower limit of the ephemeral range, oprational flow branches "NO" to the cache module 612. Likewise, referring back to the upper limit module 606, if the upper limit module 606 detects that the destination memory object is above the upper limit of the ephemeral range, operational flow branches "NO" to the cache module 612.

The cache module 612 detects if all of the non-zero cache entries have been traversed. If the cache module 612 detects that not all of the non-zero cache entries have been traversed, operational flow branches "NO" to the examine operation 604, and operational flow proceeds as previously described.

If the cache module 612 detects that all of the non-zero cache entries have been traversed, and thus all of the generational pointers have been captured, operational flow branches "YES" to a sweep operation 616. The sweep operation 616 sweeps all of the memory objects, live and dead, in the ephemeral region. A reclaim operation 618 reclaims the unmarked memory objects for later use by the computing system. Operational flow ends at termination point 620.

The operational flow charts depicted in FIGS. 4–6 may best be understood in terms of application examples. Referring to FIGS. 3–4 first, in a first application example, the ephemeral region is depicted as the region below line 350 in the data object memory 334. Thus, memory objects 336d, 336g, 336h, and 336i are in the ephemeral region. Assuming that memory object 336h is not yet allocated, the store operation 404 stores memory object 338h. The monitor operation 406 monitors the memory object 336h for pointers.

A pointer module 407 detects whether any pointers exist above the ephemeral range. The result of this test is saved so that the system 400 need not perform this test again until new address space is allocated. If the pointer module 407 detects that pointers exist above the ephemeral range, operational flow proceeds to the upper limit module 408. If the pointer module 407 detects that pointers do not exist above the ephemeral range, operational flow proceeds to the lower limit module 409.

Referring to the lower limit module 409, the lower limit module detects that pointer 352, FIG. 3 is above the lower limit of the ephemeral range, and operational flow branches "YES" to the modify operation 410. The modify operation 410 modifies a bit table associated with the memory object 336h to indicate to the garbage collection system 500, FIG. 5, that a pointer from memory object 336c to memory object 336h has been created. The cache operation 412 sets the cache entry to non-zero indicating to the garbage collection system 500 that the bit table has been modified and needs to be examined. Operational flow ends at termination point 414. Similarly, memory object 336g would also have it's associated bit table modified by the modify operation and the cache operation would set that bit table's cache entry to non-zero.

Referring now to FIGS. 3, 5, and 6, operational flow begins at flow connection 502. The halt operation 504 halts the execution of any currently running program or applications. The traverse operation 506 traverses the first root reference 338a. The reference module 508 detects that there are not any references to other memory objects, and operational flow branches "NO" the root module 524. The root module 524 detects that there are other root references, and operational flow branches "NO" to the advance operation 526. The advance operation 526 advances the system 500 to the next root reference 338b.

The traverse operation 506 traverses the next root reference 338b. The reference module 508 detects that there are other references to other memory objects, and operational flow branches "YES" to the goto operation 510. The goto operation advances the system 500 to the memory object 336d. The object module 512 detects that the memory object 336d is not already marked, and operational flow branches "NO" to the upper limit module 514. The upper limit module 514 detects that the object is below the upper limit of the ephemeral range, and operational flow branches "YES" to the lower limit module 516.

The lower limit module detects that the memory object 336d is above the lower limit, line 350, and operational flow branches "YES" to the mark operation 518. The mark operation 518 marks the memory object 336d as reached, or live. The subobject module 522 detects that memory object 336d does not have any subobjects, and operational flow branches "NO" to the reference module. Operational flow proceeds as previously described until the root reference 338e is reached.

Referring to the object module 512, the object module 512 detects that the object is already marked, and operational flow branches "YES" to the reference module 508. Operational flow proceeds as previously described through the root reference 338i. The root module 524 detects that there are not any other root references to be traversed, and operational flow branches to flow connection 600.

Referring to FIGS. 3 and 6, the cache module 602 detects that the cache entry associated with memory object 336g is non-zero, as described in connection with FIG. 4. Operational flow branches "YES" to the examine operation 604. The examine operation 604 examines the bit table associated with the non-zero cache entry for memory object 336g. The upper limit module 606 detects that the destination object is below the upper limit of the ephemeral region. The lower limit module 608 detects that the memory object 336*d* is above the lower limit, line 350, of the ephemeral region, and operational flow branches "YES" to the mark operation 610.

The mark operation 610 marks the memory object 336*d* as reached. The cache module 612 detects that there are other non-zero cache entries, and operational flow branches "NO" to the examine operation 604. Operational flow proceeds as previously described for memory object 336*g*.

The cache module 612 detects that all non-zero cache entries have been traversed, and operational flow branches "YES" to the sweep operation 616. The sweep operation 616 sweeps every memory object, 336*d*, 336*h*, 336*g*, and 336*i* in the ephemeral range. The reclaim operation 618 reclaims memory block 336*i* as unmarked. Operational flow ends at flow termination 620.

As described herein, the garbage collection system 500 parsed all of the memory objects in the ephemeral region and reclaimed only the dead memory objects, 336*i*, leaving the live memory objects 336*d*, 336*g*, and 336*h* intact for continued use. The garbage collection system 500 identified and marked memory objects 336*g*, 336*h* through the use of the write-barrier system. The garbage collection system 500 optimized the process by only checking that the memory objects were above the lower limit of the ephemeral region rather than having to check both the upper and lower limit of the ephemeral region. Thus, the execution time of the garbage collection system 500 is reduced. This optimized garbage collection system 500 can be used with any garbage collection technique, such as the mark-and-sweep technique and the copying technique.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of detecting and indicating pointers in an ephemeral region of memory in a computing system, the method comprising:
   monitoring stored memory for pointers;
   detecting if there are pointers above the ephemeral range; and
   if there are not pointers above the ephemeral range, then testing if a pointer is above a lower limit of the ephemeral range without testing if the pointer is also below an upper limit of the ephemeral range.

2. A method according to claim 1 further comprising:
   if there are pointers above the ephemeral range, then testing if a pointer is above a lower limit of the ephemeral range and testing if a pointer is also below an upper limit of the ephemeral range.

3. A method according to claim 1 wherein:
   detecting if there are pointers above the ephemeral range includes detecting if there are pointers above the ephemeral range only once until new address space is allocated.

4. A method according to claim 1 wherein:
   monitoring includes using a card-marking technique.

5. A method according to claim 1 further comprising:
   modifying a bit table associated with the pointer to indicate to a garbage collection system that a pointer exists.

6. A method according to claim 5 further comprising:
   setting a cache entry to non-zero.

7. A method according to claim 6 further comprising:
   examining the bit table for pointers.

8. A method according to claim 1 further comprising:
   detecting if a memory object is marked; and
   if the memory object is not marked, marking the memory object if it is in the ephemeral range.

9. A method according to claim 1 further comprising:
   sweeping every memory block; and
   reclaiming unmarked memory blocks.

10. A method according to claim 1 wherein:
    monitoring stored memory for pointers includes recursively monitoring stored memory for pointers.

11. A computer program product readable by a computing system and encoding instructions for a computer process for detecting and indicating pointers in an ephemeral region of memory in a computing system, the computer process comprising:
    monitoring stored memory for pointers;
    detecting if there are pointers above the ephemeral range; and
    if there are not pointers above the ephemeral range, then testing if a pointer is above a lower limit of the ephemeral range without testing if the pointer is also below an upper limit of the ephemeral range.

12. A computer program product according to claim 11 further comprising:
    if there are pointers above the ephemeral range, then testing if a pointer is above a lower limit of the ephemeral range and testing if a pointer is also below an upper limit of the ephemeral range.

13. A computer program product according to claim 11 wherein:
    detecting if there are pointers above the ephemeral range includes detecting if there are pointers above the ephemeral range only once until new address space is allocated.

14. A computer program product according to claim 11 wherein:
    monitoring includes using a card-marking technique.

15. A computer program product according to claim 11 further comprising:
    modifying a bit table associated with the pointer to indicate to a garbage collection system that a pointer exists.

16. A computer program product according to claim 15 further comprising:
    setting a cache entry to non-zero.

17. A computer program product according to claim 16 further comprising:
    examining the bit table for pointers.

18. A computer program product according to claim 11 further comprising:

detecting if a memory object is marked; and if the memory object is not marked, marking the memory object if it is in the ephemeral range.

19. A computer program product according to claim 11 further comprising:

sweeping every memory block; and reclaiming unmarked memory blocks.

20. A computer program product according to claim 11 wherein:

monitoring stored memory for pointers includes recursively monitoring stored memory for pointers.

21. A system for detecting and indicating pointers in an ephemeral region of memory, the system comprising:

a monitor module that monitors stored memory for pointers;

a pointer module that detects if there are pointers above the ephemeral range; and a lower limit module that, if there are not pointers above the ephemeral range, tests if a pointer is above a lower limit of the ephemeral range without testing if the pointer is also below an upper limit of the ephemeral range.

22. A system according to claim 21 further comprising:

an upper limit module that, if there are pointers above the ephemeral range, tests if a pointer is also below an upper limit of the ephemeral range.

23. A system according to claim 21 wherein:

the pointer module detects if there are pointers above the ephemeral range only once until new address space is allocated.

24. A system according to claim 21 wherein:

the monitor module uses a card-marking technique.

25. A system according to claim 21 further comprising:

a modify module that modifies a bit table associated with the pointer to indicate to a garbage collection system that a pointer exists.

26. A system according to claim 25 further comprising:

a cache module that sets a cache entry to non-zero.

27. A system according to claim 26 further comprising:

an examine module that examines the bit table for pointers.

28. A system according to claim 21 further comprising:

an object module that detects if a memory object is marked; and a mark module that, if the memory object is not marked, marks the memory object if it is in the ephemeral range.

29. A system according to claim 21 further comprising:

a sweep module that sweeps every memory block; and a reclaim module that reclaims unmarked memory blocks.

30. A system according to claim 21 wherein:

the monitor module recursively monitors stored memory for pointers.

\* \* \* \* \*